(12) United States Patent
Anderson et al.

(10) Patent No.: US 10,282,721 B2
(45) Date of Patent: May 7, 2019

(54) SYSTEM AND METHOD FOR PRICE VERIFICATION IN A RETAIL ENVIRONMENT (71) Applicant: Lexmark International, Inc., Lexington, KY (US)

(72) Inventors: John Douglas Anderson, Lexington, KY (US); Christopher Michael Nelson, Lexington, KY (US); Adam Randal Wiedemann, Lexigton, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 820 days.

(21) Appl. No.: 14/735,266

(22) Filed: Jun. 10, 2015

(65) Prior Publication Data
US 2016/0364711 A1 Dec. 15, 2016

(51) Int. Cl.
G06Q 20/20 (2012.01)
G06Q 30/02 (2012.01)

(52) U.S. Cl.
CPC ........... *G06Q 20/201* (2013.01); *G06Q 30/02* (2013.01); *G09G 2370/16* (2013.01); *G09G 2380/04* (2013.01)

(58) Field of Classification Search
CPC .. G06Q 20/201; G06Q 30/02; G09G 2370/16; G09G 2380/04
USPC .......................................................... 705/20
See application file for complete search history.

(56) References Cited

U.S. PATENT DOCUMENTS

| 4,066,910 | A | * | 1/1978 | Swift | G06K 7/10851 235/454 |
| 5,448,226 | A | * | 9/1995 | Failing, Jr. | G06K 17/0022 235/383 |
| 5,659,847 | A | | 8/1997 | Tsuda et al. | |
| 6,002,898 | A | | 12/1999 | Yokomori et al. | |
| 6,032,002 | A | | 2/2000 | Yokomori et al. | |
| 6,256,467 | B1 | | 7/2001 | Yokomori et al. | |
| 6,285,024 | B1 | | 9/2001 | PInnock | |
| 7,480,472 | B2 | | 1/2009 | Williams et al. | |
| 7,559,635 | B2 | | 7/2009 | Conway et al. | |

(Continued)

OTHER PUBLICATIONS

Final Office Action dated Jun. 20, 2016 for U.S. Appl. No. 14/573,265 (Anderson et al.).

(Continued)

*Primary Examiner* — A. Hunter Wilder
*Assistant Examiner* — Joseph M Mutschler (57) ABSTRACT A system for verifying a price associated with an item in a retail environment includes a price tag having an optical member that includes an optical characteristic that modifies an amount of optical energy that leaves the optical member relative to an amount of optical energy received by the optical member, and a price tag holder including an optical sensor having an emitter and a detector. The emitter is positioned to emit optical energy onto the optical member and the detector is positioned to receive optical energy leaving the optical member. A computing device in operable communication with the optical sensor is operative to determine whether the price tag is accurate based upon a comparison between the amount of optical energy received by the detector and the amount of optical energy emitted by the emitter.

8 Claims, 6 Drawing Sheets (56) References Cited

U.S. PATENT DOCUMENTS

| | | |
|---|---|---|
| 8,096,646 B2 | 1/2012 | Hattori et al. |
| 8,985,442 B1 | 3/2015 | Zhou et al. |
| 2004/0001723 A1 | 1/2004 | Ashida et al. |
| 2004/0218934 A1 | 11/2004 | Silverbrook |
| 2004/0264984 A1 | 12/2004 | Yabuki et al. |
| 2006/0222383 A1 | 10/2006 | Mukataka et al. |
| 2008/0025735 A1* | 1/2008 | Odani ................ G03G 15/0863 399/12 |
| 2011/0042591 A1* | 2/2011 | Kurose .................... G06K 7/12 250/566 |
| 2011/0123237 A1 | 5/2011 | Kudo et al. |
| 2015/0198484 A1* | 7/2015 | Nilsson .................. G09F 3/208 250/353 |

OTHER PUBLICATIONS

U.S. Appl. No. 14/573,265, filed Dec. 17, 2014.
U.S. Appl. No. 14/573,290, filed Dec. 17, 2014.

* cited by examiner

SYSTEM AND METHOD FOR PRICE VERIFICATION IN A RETAIL ENVIRONMENT

CROSS REFERENCES TO RELATED APPLICATIONS

None.

BACKGROUND

1. Field of the Disclosure

The present disclosure relates generally to price verification systems and more particularly to systems and methods for verifying accuracy of price tags in a retail environment.

2. Description of the Related Art

In a retail environment, it is common for prices displayed for items, such as on price tags on the shelves that hold the items, to be inaccurate due to human error as they are manually placed/replaced by human personnel on the shelves. Price discrepancies mislead customers that are simply investigating items they are interested in purchasing, and much worse customers making actual purchases as the actual price charged upon check out of an item at a counter may not match the price displayed for the item on the shelf. These situations often cause customer inconvenience, frustration, dissatisfaction and, in other cases, customer disloyalty resulting in lost sales. It is therefore necessary to ensure that correct prices are displayed by price tags to provide customers with a desirable customer experience.

One common practice to verify whether price tags are accurate is to perform manual inspection of individual price tags. Manual verification typically requires human personnel to manually check each price tag's price and compare it against a listed price. This practice can be cumbersome and time consuming which could take a relatively long time to complete. Retailers are also sometimes faced with difficulty in scheduling regular manual verification procedures as employees are often busy with a wide variety of other tasks related to maintaining the retail environment, and employing additional people to assist may not be an option due to cost considerations. Accordingly, there is a need for a more efficient way of verifying accuracy of prices displayed for items in a retail environment.

SUMMARY

A system for verifying a price associated with an item in a retail environment according to one example embodiment includes a price tag having an optical member that includes an optical characteristic that modifies an amount of optical energy that leaves the optical member relative to an amount of optical energy received by the optical member, and a price tag holder including an optical sensor having an emitter and a detector. The emitter is positioned to emit optical energy onto the optical member and the detector is positioned to receive optical energy leaving the optical member. A computing device in operable communication with the optical sensor is operative to determine whether the price tag is accurate based upon a comparison between the amount of optical energy received by the detector and the amount of optical energy emitted by the emitter.

A holder for holding a price tag in a retail environment according to another example embodiment includes a frame and an optical sensor including an emitter and a detector attached to the frame. The emitter is positioned to emit optical energy onto an optical member of the price tag and the detector is positioned to receive optical energy that leaves the optical member. Circuitry is coupled to the optical sensor and is in operable communication with a controller for transmitting thereto information corresponding to the amount of optical energy received by the detector. At least one pricing attribute associated with the price tag is determinable by the controller based on the amount of the optical energy received by the detector.

A method for determining accuracy of a price provided for an item in a retail environment according to another example embodiment includes emitting, by an optical sensor, optical energy onto an optical member of a price tag. An optical characteristic of the optical member modifies an amount of optical energy leaving the optical member relative to an amount of optical energy received by the optical member. The method further includes detecting, by the optical sensor, the amount of optical energy leaving the optical member. A controller receives an indication of the detected amount of optical energy and determines an accuracy of the price tag based on the amount of optical energy detected by the optical sensor relative to an amount of optical energy emitted by the optical sensor.

A system for facilitating price verification of items in a retail environment according to another example embodiment includes a plurality of price tag holders and a communication controller. Each Price tag holder includes an optical sensor for reading an optical member of a price tag mounted on a corresponding price tag holder, and the communication controller receives, from each of the plurality of price tag holders, data corresponding to an output of the optical sensor. The communication controller transmits the data to a computing device. At least one pricing attribute associated with each price tag mounted on each of the plurality of price tag holders is determinable by the computing device based on the data received thereby, and the price verification is performed by the computing device using the at least one pricing attribute.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

In addition, it should be understood that example embodiments of the disclosure may include both hardware and electronic components or modules that, for purposes of discussion, may be illustrated and described as if the majority of the components were implemented solely in hardware.

it will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable storage medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks. Computer readable storage medium includes, for example, disks, CD-ROMS. Flash ROMS, nonvolatile ROM and RAM.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Figure 1:
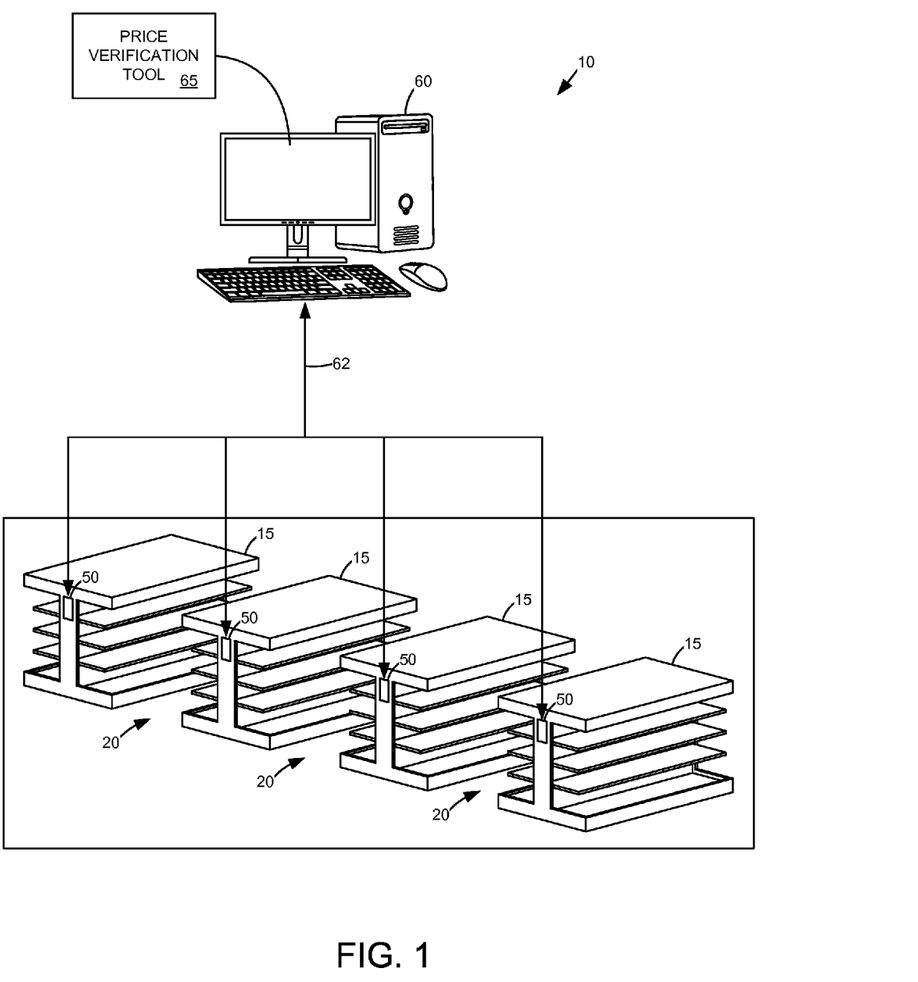
FIG. 1 is a diagram of a computing system in a retail environment including a plurality of retail shelves according to one example embodiment.
Figure 2:
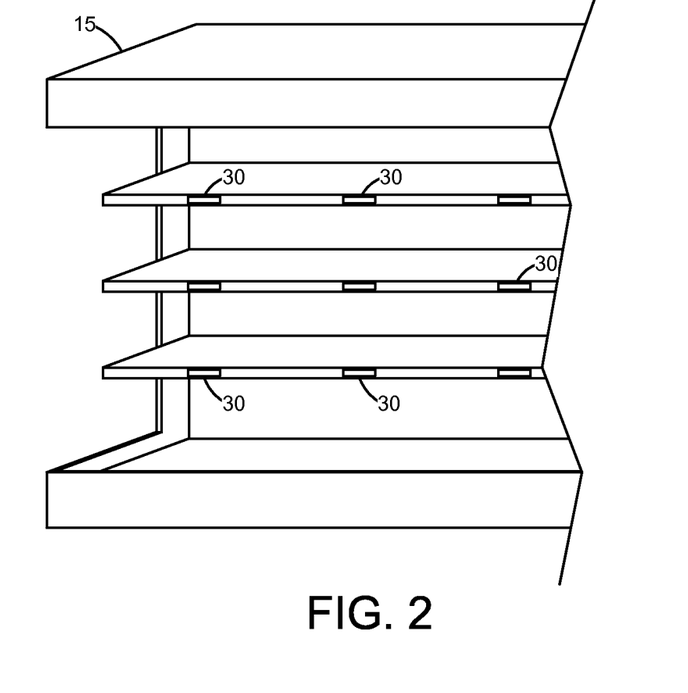
FIG. 2 is an illustrative view of a shelf in the retail environment including a plurality of price tag holders according to one example embodiment.

Referring now to the drawings and more particularly to FIG. 1, an example retail environment 10 in a store location is shown having a plurality of store shelves 15. The retail environment 10 can be any retail environment, such as a supermarket, a department store, a drug store, a shop, or other place of business or retail setting. Generally, each shelf 15 is structured to hold and display merchandise for purchase. Accordingly, it will be appreciated that the retail environment 10 may use other types or structures of shelves or racks for displaying merchandise other than those depicted in FIG. 1. The shelves 15 may be arranged in the store location to form an aisle 20 between adjacent shelves 15 and/or along sections of the shelves 15 to allow customers to access displayed merchandise for purchase. In FIG. 2, each shelf 15 includes a plurality of price tag holders 30 attached to the rails of the shelf 15 or other locations thereof that allows them to be visibly observed by consumers. Each price tag holder 30 is adapted to hold a price tag or label bearing information indicating the price of a corresponding item on the shelf 15, and can be mounted on shelf 15 using suitable fasteners (e.g., screws, rivets, etc.) or other suitable mounting techniques known in the art.

In one example embodiment, each shelf 15 in the retail environment 10 is provided with a communication control system 50 for communicating with a computing device 60. Each communication control system 50 on shelf 15 communicates with computing device 60 via a communication link 62. As used herein, the term "communication link" is used to generally refer to structure that facilitates electronic communication between multiple components, and may operate using wired or wireless technology. A communication link may be a direct electrical wired connection, a direct wireless connection (e.g., infrared or r.f), or a network connection (wired or wireless), such as for example, an Ethernet local area network (LAN) or a wireless networking standard, such as IEEE 802.11. Computing device 60 may be a store central computer, a server, or any remote computing system or device, and may include a controller or other processing circuitries. In one example embodiment, computing device 60 makes available a price verification application or tool 65 that a user can utilize to determine accuracy of pricing information displayed by price tags on price tag holders 30 for products on each shelf 15 in the retail environment 10. In particular, price verification tool 65 receives, from the communication control system 50 of each shelf 15, data streams indicating information associated with price tags displayed for merchandise on the shelf, determines sales-related information associated with the items using the received data streams, and verifies accuracy of the price tags using the determined sales-related information, as will be explained in greater detail below.

Figure 3A:
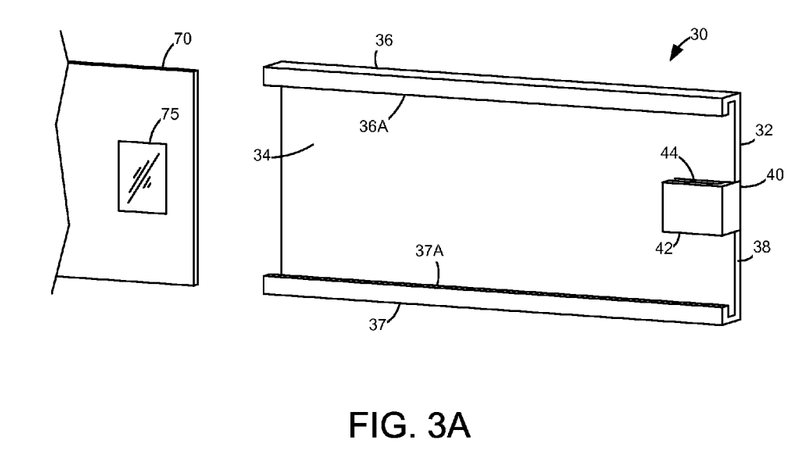
FIG. 3A is a perspective view of a price tag and a price tag holder on which the price tag is mountable according to one example embodiment.
Figure 3B:
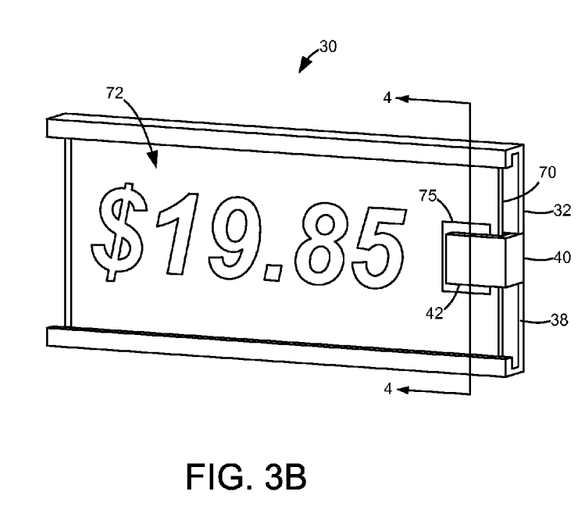
FIG. 3B is a perspective view illustrating the price tag in FIG. 3A inserted into the price tag holder.

FIGS. 3A-3B illustrate a price tag holder 30 for holding a price tag 70 according to one example embodiment. Price tag holder 30 includes a frame 32 having a back member 34 and guide members 36, 37 disposed about the upper and lower edges of frame 32. Frame 32 can be made of metal or plastic material, or a combination thereof. The front edges 36A, 37A of each guide member 36, 37 are spaced from the back member 34 to allow price tag 70 to be inserted and positioned within frame 32, and to hold price tag 70 in place therein as shown in FIG. 3B. When the price of an item changes, an individual can replace or change the price tag 70 in order to indicate the new price.

Figure 4:
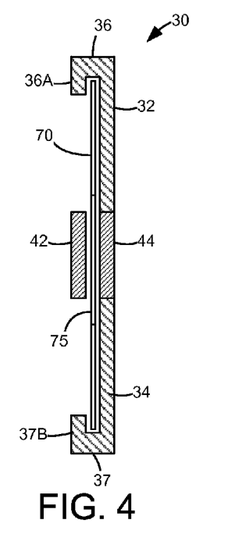
FIG. 4 is a cross-sectional view of the price tag holder taken along lines 4-4 of FIG. 3B.

An optical sensor 40 is attached about an end 38 of frame 32 and includes an emitter 42 and a detector 44. FIG. 4 illustrates a cross-sectional view of the price tag holder 30 taken along lines 4-4 of FIG. 3B. Emitter 42 and detector 44 are spaced from each other to allow a portion of price tag 70 to move and be positioned therebetween, such as when price tag 70 reaches its final position within frame 32. Emitter 42 emits electromagnetic or optical energy, which may consist of visible light or near-visible energy (e.g., infrared or ultraviolet), that is detectable by detector 44. Emitter 42 may be embodied as an LED, a laser diode, or any other suitable device for generating optical energy. Detector 44 may be implemented as a photodetector, such as a photodiode, PIN diode, phototransistor, or other devices capable of converting optical energy into an electrical signal. Emitter 42 emits optical energy along an optical path and detector 44 receives the optical energy from emitter 42. In the example illustrated, optical sensor 40 is positioned on the rightmost end of frame 32. However, it is contemplated that optical sensor 40 may be positioned elsewhere on frame 32.

In accordance with example embodiments of the present disclosure, each price tag 70 may include one or more optically readable features that are encoded with sales-related information associated with a product or item. Sales-related information, in general, may include pricing information such as price value, price class, price tag version, pricing effectivity dates, etc., associated with an item. An optically readable feature, in general, exhibits optical characteristics or properties which allow it to modify an amount of optical energy that leaves the optically readable feature relative to an amount of optical energy received thereby. The optical characteristics or properties are directly or indirectly correlated with sales-related information. Example optical properties may include, but are not limited to, transmissivity and reflectivity which allow the optically readable feature to transmit and/or reflect optical energy directed to it. Optical energy transmitted or reflected by the optically readable feature can be detected and used by computing device 60 to determine sales-related information associated with an item and verify whether a price tag is accurate. For example, at least one pricing attribute associated with a price tag may be determined based at least upon an amount of optical energy received by the detector 44 relative to an amount of optical energy emitted by the emitter 42, as will be explained in greater detail below. The optically readable feature is readable by optical sensor 40 mounted on price tag holder 30.

In the example embodiment illustrated in FIGS. 3A-3B, price tag 70 includes a price value indicator 72 (shown as $19.85) and an optically readable transmissive member 75. The location of transmissive member 75 corresponds to a location of optical sensor 40 such that transmissive member 75 is positionable between emitter 42 and detector 44 of optical sensor 40 and readable thereby upon insertion of price tag 70 into frame 32. Transmissive member 75 generally includes a transmissive region having a characteristic transmissivity for changing an amount of optical energy received by the detector 44 of optical sensor 40 relative to an amount of optical energy emitted by emitter 42. In one example, the transmissive region may be constructed of a material having a substantially transmissive base material, such as polycarbonate, and additives that modify opacity and transmissivity thereof. In another example, transmissivity may be modified by varying the thickness of the transmissive member 75. In still another example, transmissive member 75 may have a textured surface that can cause scattering and/or reflection of incident optical energy emitted by the optical sensor emitter 42 and, thus, less energy reaching the detector 44. As will be appreciated, transmissivity of the transmissive region may be modified to block optical energy using different combinations of scattering, diffusion, reflection, absorption, diffraction or other mechanisms as are known in the field of optics and electromagnetics.

Figure 5:
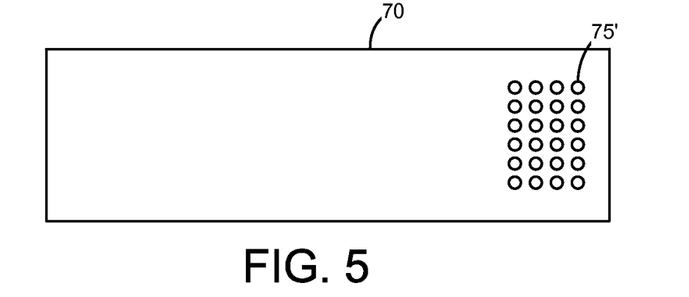
FIG. 5 illustrates the price tag including a transmissive member according to one example embodiment.
Figure 6:
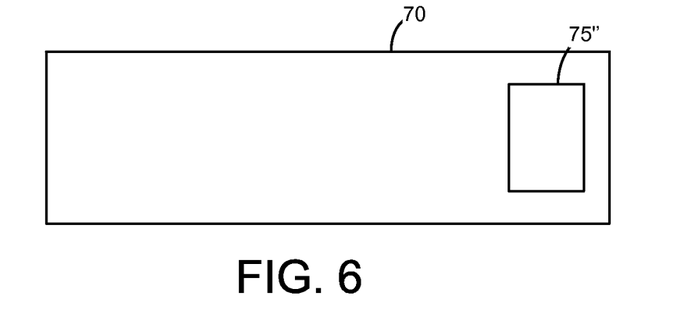
FIG. 6 illustrates the price tag including a transmissive member according to another example embodiment.

In one example embodiment, transmissive member 75 may be integrally formed as a unitary piece with price tag 70. In one example, price tag 70 may be molded having translucent and opaque regions, with the translucent region forming transmissive member 75. In another example, price tag 70 may be provided as an opaque member and the transmissive member 75 may be achieved by forming one or more holes through the opaque material to vary the amount of optical energy allowed to pass through. In another example embodiment, price tag 70 may be provided as a translucent or transparent member, and transmissive member 75 may be achieved by varying the transmissivity of a portion of price tag 70 using different techniques. For example, the translucent or transparent member may be printed with a printed pattern 75', such as shown in FIG. 5, or a coating or sticker 75" may be applied to the translucent or transparent member, as shown in FIG. 6, to modify the transmissivity of the member.

Figure 7:
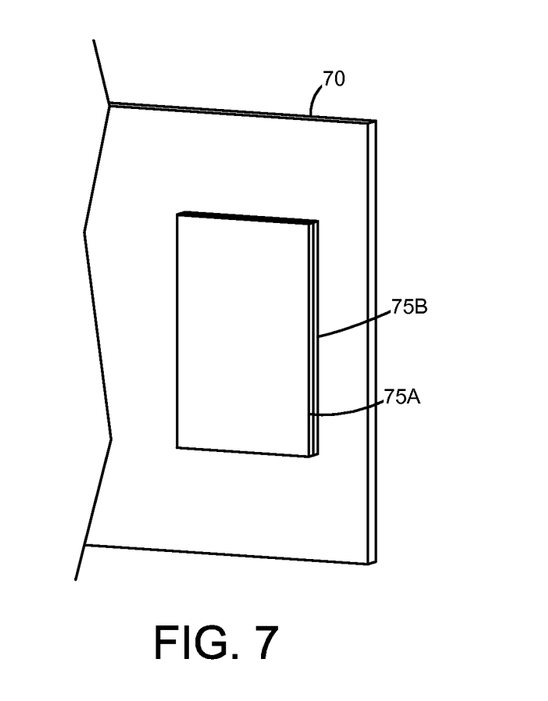
FIG. 7 illustrates the price tag including multiple transmissive members according to another example embodiment.

In another example embodiment, multiple transmissive members may be positioned in a stacked arrangement on price tag 70 to achieve different transmissivity values. For example, with reference to FIG. 7, a first transmissive member 75A having a first transmissivity is applied on top of a second transmissive member 75B having a second transmissivity on price tag 70 to form a stack of transmissive members resulting in a net transmissivity equal to a product of the individual transmissivities of transmissive members 75A, 75B. By using multiple transmissive members in a stacked arrangement, various combinations of possible net transmissivity values may be obtained for indicating sales-related information associated with an item. For example, where there are two types of transmissive members having two different transmissivities and two transmissive members are stacked together, four net transmissivity values are available for indicating sales-related information. In general, where N types of transmissive members having N different transmissivities are arranged in a stack of X transmissive members, $X^N$ possible net transmissivity values are available for use. This example embodiment can provide relatively fewer unique components to manage which can be advantageous for manufacturing.

It will be understood that price tag holder 30 may be configured differently and may use other types or structures for holding price tags other than those depicted in the example illustrations, and that transmissive members of different sizes, shapes, or patterns can be used, and other positioning or arrangements between transmissive member and sensor may be implemented.

Figure 8:
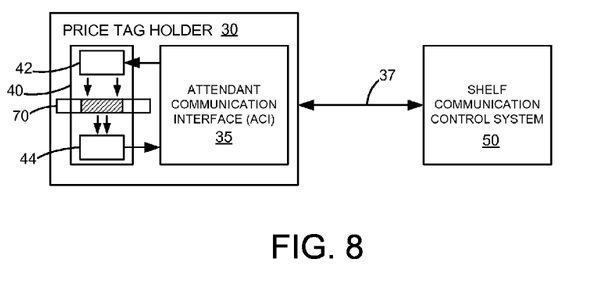
FIG. 8 is a block diagram illustrating communication between a price tag holder and a shelf communication control system according to one example embodiment.

With reference to FIG. 8, price tag holder 30 may include circuitry comprising an attendant communication interface 35 coupled to optical sensor 40. Attendant communication interface 35 is communicatively coupled to communication control system 50 of a shelf 15 via a communication link 37. Attendant communication interface 35 is configured to communicate with shelf communication control system 50, and to communicate with optical sensor 40 to control activation of emitter 42 and receive signals from detector 44 based on instructions received from shelf communication control system 50. Additional circuitries on board attendant communication interface 35 may also be used to convert signals into forms suitable for use by attendant communication interface 35, optical sensor 40, and/or shelf communication control system 50.

Figure 9:
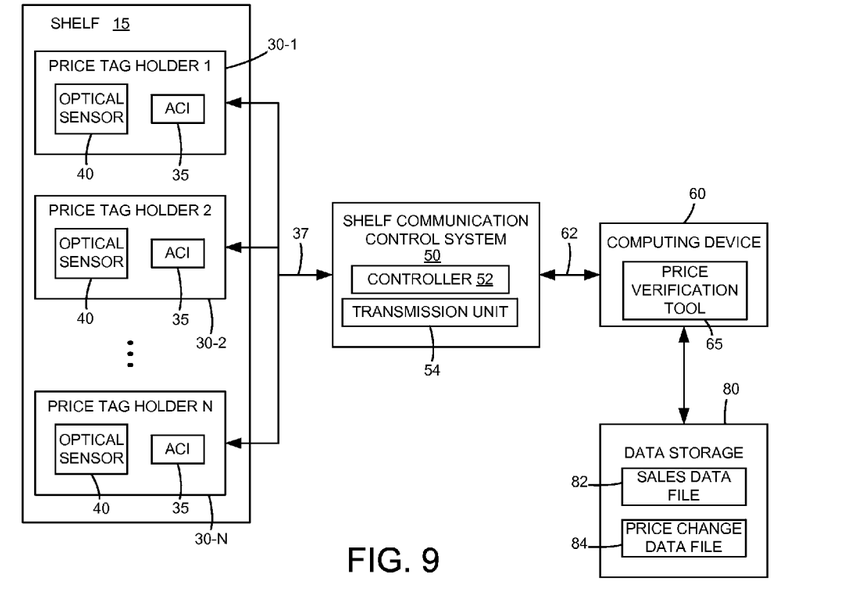
FIG. 9 is a block diagram illustrating communication between multiple price tag holders on a shelf, the shelf communication control system, and a computing device, according to one example embodiment.

With reference to FIG. 9, multiple price tag holders 30-1, 30-2 , . . . , 30-N on a common shelf 15 are shown communicatively coupled to a dedicated shelf communication control system 50 via communication link 37. Further, shelf communication control system 50 is shown in operable communication with computing device 60 via a communication link 62, and is configured to communicate therewith to facilitate price verification of items on the shelf 15. In one example embodiment, shelf communication control system 50 may include a controller 52. Controller 52 typically contains digital logic for processing data and communicates with various components resident on shelf communication control system 50. These resident components may include a transmission unit 54, volatile and/or non-volatile memory modules (not shown), and several other components. In one example embodiment, controller 52 may decode and/or demodulate information signals received from computing device 60 or attendant communication interface 35, and encode and/or modulate information signals for transmission by transmission unit 54 to computing device 60 or attendant communication interface 35. In addition, communications control system 50 may perform other additional functions. Price verification tool 65 uses information received from communication control system 50 to facilitate price verification of items on the shelf 15. Price verification tool 65 may have access to a repository or data storage 80 to retrieve sales-related information including, but not limited to, item information and pricing information. Data storage 80 may be memory associated with computing device 60, remotely stored over the Internet or in the cloud on a server, a USB drive, an external hard drive, or other storage location external to computing device 60.

In operation, price verification tool 65 sends a command to shelf communication control system 50 to instruct one or more attendant communication interfaces 35 connected thereto to generate signals for driving the emitters 42 of associated optical sensors 40 to emit optical energy, and to receive output signals generated by corresponding detectors 44 based on the amount of received optical energy. As transmissive member 75 on a price tag 70 is positioned along the optical transmission path between emitter 42 and detector 44, it operates as an interrupter of sorts which blocks at least some fraction of the optical energy emitted by emitter 42 that is incident on transmissive member 75 and allows at least some fraction of the optical energy incident on transmissive member 75 to pass therethrough and reach detector 44. Optical sensor 40 generates information from reading transmissive member 75 and provides the information to attendant communication interface 35. Raw data by optical sensor 40 may be converted to discrete digital values. For example, data obtained from optical sensor 40 may be encoded into one of a plurality of discrete values corresponding to a transmissivity value. As an example, for an 8-bit resolution, data obtained from optical sensor 40 may be encoded into one of 256 discrete values (0-255) that defines a transmissivity value.

Data obtained from each optical sensor 40 are sent by attendant communication interface 35 to shelf communication control system 50 and are subject to processing by controller 52. In turn, shelf communication control system 50 transmits information received from each price tag holder 30 on the shelf 15 to computing device 60. In one example embodiment, each price tag holder 30 is assigned with a unique location and unique identifying information, such as identifiers that establish an identity of each price tag holder 30 that may be used to reference and/or determine a location of the price tag holder 30 within the retail environment 10 or, more specifically, its relative location on the shelf 15. Attendant communication interface 35 may encapsulate the identifying information together with data corresponding to the output of detector 44 for each price tag holder 30 in such a manner that controller 52 of shelf communication control system 50 and/or price verification tool 65 at computing device 60 may extract the data corresponding to the output of detector 44 as well as the identifying information, and then ascertain the location of each price tag holder 30 and/or an item assigned thereto based on the identifying information.

In one example embodiment, price verification tool 65 may correlate the identifying information associated with each price tag holder 30 and/or a location thereof on the shelf to a particular product or item in the retail environment 10. For example, the identifying information and/or a determined location may direct price verification tool 65 to access a lookup table to look for an association or mapping where an item associated with the price tag holder may be located. Table 1 illustrates an example lookup table having multiple (N) table records with each table record including an identifier (ID n) associated with a price tag holder, corresponding location information (LOC INFO n) where the price tag holder is located, and an item identification (ITEM ID n) which identifies a store item assigned to the price tag holder. The location information generally indicates product placement and may include a station, floor number, shelf number, an aisle number, a section of the shelf and/or the aisle, or any other form of information that may be associated with the different parts of or areas within the retail environment 10. Given an identifier and/or location information, a corresponding store item can be identified.

TABLE 1

| Identifier | Location | Item Identification |
|---|---|---|
| ID 1 | LOC INFO 1 | ITEM ID 1 |
| ID 2 | LOC INFO 2 | ITEM ID 2 |
| . . . | . . . | . . . |
| ID N | LOC INFO N | ITEM ID N |

Data corresponding to the detector output of each price tag holder 30 is analyzed by computing device 60, or other processing circuitries associated with price verification tool 65, to determine transmissivity of the transmissive member 75 included in the price tag 70 mounted on the price tag holder 30. Generally, transmissivity may be determined based on a comparison between the amount of optical energy received by the detector 44 and the amount of optical energy emitted by its corresponding emitter 42. Price verification tool 65 may determine at least one pricing attribute associated with the price tag based at least upon the determined tranmissivity. For example, price verification tool 65 may access data storage 80 to access a sales data file 82 and retrieve sales-related information associated with the identified store item to which the price tag holder 30 is assigned, and use such information together with the determined transmissivity to determine a price class or version of the price tag in accordance with the identified store item. An example table showing transmissivity values (in terms of percentage) that correlate to different price versions for an item is illustrated in Table 2.

TABLE 2

Transmissivity and Sales-Related Information for an Item

| Transmissivity | Price Class/Version | Price |
|---|---|---|
| 5%-20% | Regular Price | P1 |
| 30%-45% | Sale Price | P2 |
| 55%-70% | Clearance Price | P3 |
| 80%-95% | Weekend Price | P4 |

As shown, Table 2 includes a plurality of table records. Each table record includes a predetermined transmissivity range and sales-related information associated with a store item. The predetermined transmissivity range corresponds to a range of transmissivity values within which transmissivity of a transmissive member 75 on a price tag 70 being read may fall, and the sales-related information includes one or more attributes or pricing information for the item. Pricing information, in this example, includes price classes/versions such as regular price, sale price, clearance price, and weekend price available for the item, each having a corresponding price. As an example, if a transmissivity value of about 40% for a transmissive member 75 is detected, then a price class/version of the price tag can be ascertained to correspond to a sale price. As a result, Table 2 provides a reference for determining price version of a price tag using transmissivity values. The transmissivity ranges allow for tolerance variations with respect to transmissive members correlated to the same price version, and can be pre-calibrated during manufacture. Multiple samples of a reference transmissive member (i.e., transmissive members of the same kind having substantially the same transmissivity to be corresponded to a common price version) are measured for transmissivity to determine a transmissivity range for such kind of transmissive member. In this way, a transmissivity range and a corresponding price version are prepared and stored for each kind of transmissive member 75. It should be appreciated that testing of transmissive members to obtain different transmissivity ranges is performed using the same type or structure of optical sensor used by price tag holder 30.

The number of table records and the predetermined transmissivity values and corresponding sales-related information are not limited to the examples illustrated above. For example, the lookup table may include more or fewer table records, and other example embodiments may include a plurality of lookup tables including other parameters or values derived from the output of optical sensor 40, and corresponding sales-related information stored in data storage 80. Computing device 60 may utilize a plurality of table address pointers for specifying which lookup table to access.

To verify whether the price tag is accurate, price verification tool 65 may access a price change data file 84 in data storage 80. Price change data file 84 may include records of price changes scheduled for the item. In one example, price change data file 84 may include at least one scheduled price version for each day for the item, and/or start and end times for each scheduled price version. In another example, price change data file 84 may include different price versions for an item and corresponding dates and/or periods of effectivity thereof. Price verification tool 65 may identify a scheduled price version for the item, such as one corresponding to a time when the verification process is performed, and compare the scheduled price version with the determined price version ascertained from reading the transmissive member 75 of the price tag 70 mounted on the price tag holder 30 assigned to such item. If there is a match between the scheduled price version and the determined price version, then it may be determined that the price tag is accurate. Otherwise, if the two price versions do not match, then it may be determined that the price tag is not accurate. In one example embodiment, if the scheduled and determined price versions do not match, price verification tool 65 may provide an indication or notification to change the price tag 70 mounted on the price tag holder 30.

In one example embodiment, price verification tool 65 may capture or collect information from each shelf communication system 50 using an event-driven architecture whereby capturing of data may be triggered when a user requests for price verification to be performed using price verification tool 65. In another example embodiment, data capture may be implemented using a polling architecture whereby price verification tool 65 may query one or more shelf communication systems 50 on a predetermined schedule.

In one example embodiment, transmissivity of a transmissive member 75 may be measured as a relative measurement obtained by measuring an amount of optical energy received by detector 44 with the absence of the transmissive member 75 and the amount of optical energy received by detector 44 when the transmissive member 75 is positioned between emitter 42 and detector 44. For example, a baseline measurement reading may be obtained by emitting optical energy along the optical path from emitter 42 to detector 44 while no price tag is mounted on price tag holder 30. When a price tag 70 is mounted on the price tag holder 30 and the transmissive member 75 on the price tag 70 moves into the optical path of optical sensor 40, optical energy collected by detector 44 may correspond to an actual measurement reading. A ratio between the actual measurement and the baseline measurement readings may be used to determine transmissivity of transmissive member 75. For example, transmissivity may be determined using a mathematical relationship: $T=Y/X$; where T corresponds to transmissivity, Y corresponds to the actual measurement reading and X corresponds to the baseline measurement reading. As an example, consider a baseline measurement reading having some trivial output of about 10 volts and an actual measurement reading of about 8 volts. In terms of percentage, transmissivity of the transmissive member is about 80%. Alternatively, actual measurement reading may be directly correlated to a transmissivity value and a corresponding price class or version, in other example embodiments. It is also contemplated that other means for representing transmissivity may also be used.

Optical sensor 40 may be calibrated to compensate for design tolerances, sensitivity variations, and the like. For example, optical energy may be directed onto detector 44 without any interruption or obstruction, such as when price tag 70 is not mounted on price tag holder 30, to produce an output voltage. If the output voltage is below a predetermined threshold, attendant communication interface 35 may adjust the signal for driving emitter 42 such that the output voltage corresponds to a desired voltage output. As will be appreciated, other methods for calibrating optical sensor 40 may be used as are known in the art.

Figure 10A:
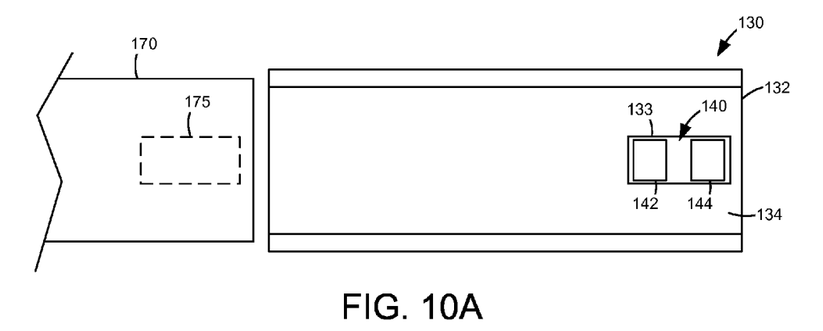
FIGS. 10A-10B illustrate front and top views, respectively, of a price tag holder and a price tag including a reflective member according to one example embodiment.
Figure 10B:
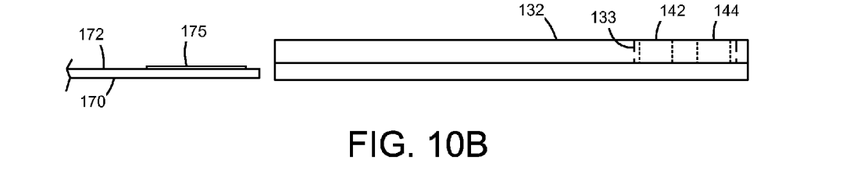
Figure 11:
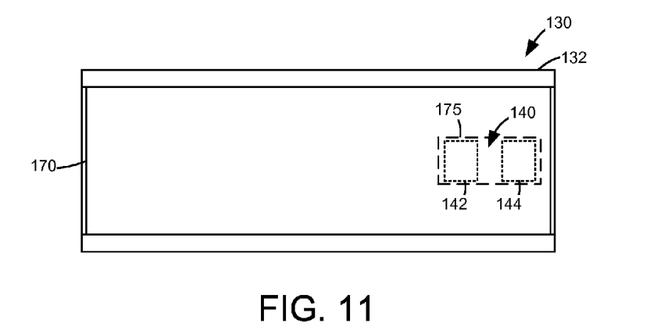
FIG. 11 illustrates the price tag in FIGS. 10A-10B inserted into the price tag holder and the reflective member positioned adjacent an optical sensor of the price tag holder according to one example embodiment.
Figure 12:
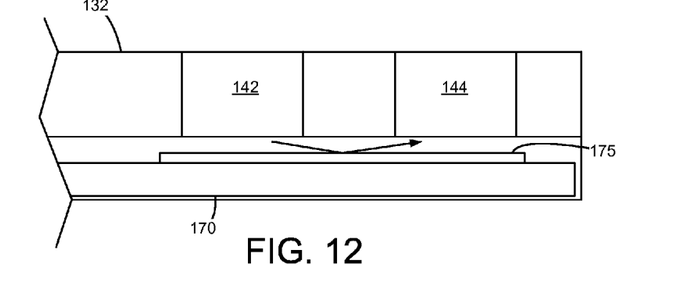
FIG. 12 illustrates the optical sensor in FIG. 11 reading the reflective member.

The above example embodiments have been described with respect to utilizing transmissivity of an optically readable feature to indicate sales-related information associated with an item via a price tag mounted to a price tag holder assigned to the item. According to another example embodiment, reflectivity of an optically readable feature may also be used, in lieu of or in addition to using transmissivity, to provide such information. For example, in FIGS. 10A-10B, a reflective member 175 is provided at the back face 172 of a price tag 170. Reflective member 175 can be constructed using different combinations of materials to modify reflectivity and to exhibit substantial reflectivity to light in the ultraviolet, visible, or infrared regions of the electromagnetic spectrum. A price tag holder 130 comprises a frame 132 having an aperture 133 formed on the back member 134 of frame 132 to provide an opening through which an optical sensor 140 attached to price tag holder 130 and disposed adjacent aperture 133 may read reflective member 175. In FIGS. 11-12, price tag 170 is mounted on price tag holder 130 and reflective member 175 coincides with the location of aperture 133 and optical sensor 140. Optical sensor 140 includes an emitter 142 which emits optical energy to reflective member 175, and a detector 144 that receives an amount of the optical energy reflected by reflective member 175.

Data corresponding to the optical energy received by detector 144 may be transmitted to computing device 60 and used by price verification tool 65 to determine reflectivity of reflective member 175. Generally, reflectivity may be determined based on a comparison between the amount of optical energy received by detector 144 and the amount of optical energy emitted by emitter 142. Using the determined reflectivity, price verification tool 65 may determine accuracy of the price tag 170 having the reflective member 175. Price verification tool 65 may access one or more stored lookup tables in performing the determinations, with each stored lookup table including reflectivity values or other parameters derived from the output of optical sensor 190, and corresponding sales-related information for the given item, in a similar manner as described above with respect to using transmissive member 75. It will also be appreciated that price tag holder 130 may be configured differently and may use other types or structures for holding price tags other than those depicted in the example illustrations, and that other structures or arrangements of reflective member and sensor may be implemented. For example, the reflective member may be provided at the front face of the price tag and the optical sensor may be positioned at the front side of frame 132 spaced from the back member 134 to allow at least a portion of the price tag to be inserted between the optical sensor and the back member.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A system for verifying accuracy of a price tag associated with an item in a retail environment, comprising:

the price tag having an optical member that includes an optical characteristic that modifies an amount of optical energy that leaves the optical member relative to an amount of optical energy received by the optical member, wherein the optical member includes a transmissive or reflective member having a transmissivity or reflectivity for passing a fraction of the optical energy received by the optical member;

a price tag holder attached to a shelf and including an optical sensor having an emitter and a detector, the emitter positioned to emit optical energy onto the optical member and the detector positioned to receive optical energy leaving the optical member from the emitter; and a computing device in operable communication with the optical sensor, the computing device operative to determine a price class or version of the price tag based upon a comparison between the amount of optical energy received by the detector and the amount of optical energy emitted by the emitter, and whether the price tag is accurate based upon a comparison of the determined price class or version and a scheduled price class or version assigned to the item in the retail environment.

2. The system of claim 1, wherein the price tag includes a transparent member and the optical member is provided by applying one of a coating and a sticker on the transparent member.

3. The system of claim 1, wherein the price tag holder includes a communication interface in operable communication with the computing device.

4. The system of claim 3, further comprising a shelf communication system in operable communication with the communication interface of the price tag holder, wherein the shelf communication system facilitates communication between the communication interface and the computing device.

5. The system of claim 4, wherein the shelf communication system is in operable communication with a plurality of price tag holders via corresponding communication interfaces thereof, and is operative to communicate information received from the plurality of price tag holders to the computing device.

6. The system of claim 1, further comprising memory storing sales-related information associated with the item, wherein the computing device determines at least one pricing attribute associated with the item by correlating a result of the comparison to the stored sales-related information.

7. The system of claim 6, wherein the storage device stores a price change data file including records of price changes scheduled for the item, the computing device operative to determine whether the price tag is accurate by comparing the at least one attribute with the records of price changes scheduled for the item.

8. The system of claim 1, wherein the computing device provides an indication to change the price tag in response to a negative determination.

* * * * *